(12) United States Patent
Siddiqui et al.

(10) Patent No.: US 9,336,271 B2
(45) Date of Patent: May 10, 2016

(54) OPTIMIZING A QUERY

(75) Inventors: Kashif A. Siddiqui, Round Rock, TX (US); Awny K. Al-Omari, Cedar Park, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1150 days.

(21) Appl. No.: 12/901,897

(22) Filed: Oct. 11, 2010

(65) Prior Publication Data

US 2012/0089596 A1 Apr. 12, 2012

(51) Int. Cl.
*G06F 7/00* (2006.01)
*G06F 17/30* (2006.01)

(52) U.S. Cl.
CPC .................................. *G06F 17/30463* (2013.01)

(58) Field of Classification Search
CPC ................................................ G06F 17/30463
USPC .......................................................... 707/720
See application file for complete search history.

(56) References Cited

U.S. PATENT DOCUMENTS

| 5,301,317 | A | 4/1994 | Lohman et al. |
| 5,671,403 | A | 9/1997 | Shekita et al. |
| 6,205,441 | B1 * | 3/2001 | Al-omari ............ G06F 17/30454 |
| 6,516,310 | B2 | 2/2003 | Paulley |
| 8,312,007 | B2 * | 11/2012 | Bestgen ............ G06F 17/30463 707/718 |
| 2003/0212701 | A1 * | 11/2003 | Beavin .............. G06F 17/30466 |
| 2004/0006561 | A1 * | 1/2004 | Nica ................. G06F 17/30466 |
| 2004/0122798 | A1 * | 6/2004 | Lin .................... G06F 17/30466 |

* cited by examiner

*Primary Examiner* — Jacob F Bétit
*Assistant Examiner* — Van Oberly
(74) *Attorney, Agent, or Firm* — International IP Law Group, P.C.

(57) ABSTRACT

A method of optimizing a query is provided herein. The method includes determining a cost estimate for a query. The method further includes determining a budget for optimizing the query based on the cost estimate. Additionally, the method includes determining a complexity of the query based on the budget. The method also includes determining a strategy based on the complexity. The strategy specifies a limit to a search space enumerated during optimization of the query. Further, the method includes optimizing the query based on the strategy.

20 Claims, 12 Drawing Sheets

OPTIMIZING A QUERY

BACKGROUND

Users of relational database management systems (DBMSs) retrieve and manipulate information in databases by specifying queries in a structured query language (SQL). The SQL is then compiled before execution.

Compilation includes a parsing process and an optimization process. In parsing, the DBMS typically parses the specified SQL into a tree of relational operators. The relational operators may specify how to implement the query.

The tree is optimized for efficient execution through the generation of an optimized tree of relational operators. This optimized tree is known as a query execution plan (plan). The plan is executed by a runtime engine in the DBMS to produce results to the user's query. Accordingly, the total response time to the user specifying the SQL includes the time spent in compilation and execution.

Queries can be categorized according to their complexity and cost. The complexity of a query represents the number of possible alternatives for implementing the query. For more complex queries, more alternatives may be explored during optimization. As such, the time spent during optimization is a function of the complexity of the user query (i.e., the number of joined entities).

One goal of optimization is to produce a query plan with a low cost. Queries are typically optimized under the assumption that more time spent during optimization results in lower cost queries.

The cost of a query is a reflection of how long the query takes to execute. Larger volumes of data take longer to execute than smaller volumes. As such, the time spent executing a query is a function of the volume of data processed.

BRIEF DESCRIPTION OF THE DRAWINGS

Certain embodiments are described in the following detailed description and in reference to the drawings, in which.

DETAILED DESCRIPTION OF SPECIFIC EMBODIMENTS

Because the total response time to the user includes both compile time and execution time, a low cost query may result in large response times for the user. For example, a cheap, but complex, query may use a great deal of compile time resources without realizing a great benefit in terms of reduced cost.

Further, costly and complex queries may reach a threshold at which additional time spent in optimization is not offset by a savings in execution time. This is especially true for queries that are cheap and complex. For such queries, the optimizer may use a significant amount of resources (e.g., memory and time), which are typically limited.

One technique for constraining the use of compile time resources is the use of optimization levels. Different optimization levels may be assigned to different query types, whereby the optimizer assigns greater amounts of resources to queries with higher optimization levels. However, optimization levels are set manually, incurring additional human resource costs. Another issue with optimization levels is that setting an optimization level for a particular query type may adversely affect queries of other types.

Another technique for constraining optimization resources is to employ heuristic pruning to reduce the size of the plan search space during optimization. The pruning rate increases with optimization time to ensure that a plan is generated no matter how complex a query. A variant of heuristic pruning may use randomization algorithms to limit the plan search space.

One issue with heuristic pruning is that more promising areas of the search space may be pruned. As such, quality query plans may be unnecessarily eliminated, resulting in the generation of more costly plans.

When optimizing large complex queries, efforts to constrain compile-time are typically balanced with efforts to minimize impact on plan quality. In one embodiment of the invention, a query's resource estimate may be used to budget optimization time. Budgeting optimization time may ensure a low total response time by lowering the time spent during optimization. Additionally, the budgeted time may be used in a manner that may prioritizes the optimization of more promising plans.

Figure 1:
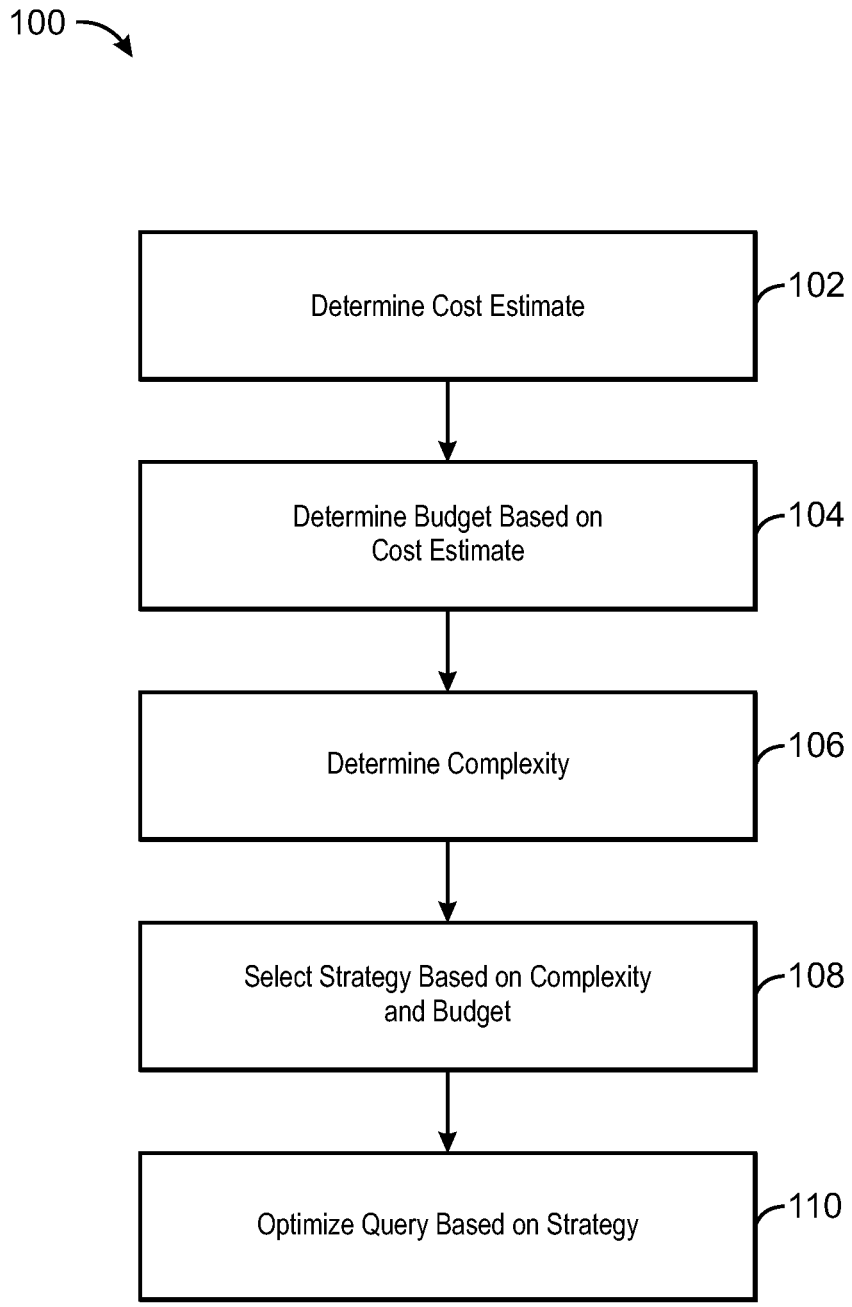
FIG. 1 is a process flow diagram of a method optimizing a query in accordance with an embodiment of the invention.

FIG. 1 is a process flow diagram of a method 100 optimizing a query in accordance with an embodiment of the invention. It should be understood that the process flow diagram is not intended to indicate a particular order of execution. The method 100 may be performed by a database optimizer (optimizer).

The method 100 begins at block 102, where the optimizer may determine a cost estimate. The cost estimate may represent resource usage for the query, e.g., the query's total execution time in CPU seconds.

Typically, a query plan is used to determine cost. However, the query plan is not available before optimization. However, a heuristic join ordering may be generated before optimization. The heuristic join ordering, also referred to herein as join ordering, may be a pre-optimization heuristic query plan for the query.

The join ordering, along with certain assumptions about physical implementations of join types, may be used to determine the cost estimate for the query. The assumptions may relate to how each join is physically implemented, whether through nested loop joins, hash joins, etc. Additionally, considerations regarding memory, CPU, and data access cost may be used to determine the cost estimate. The term, scan cost, is also used herein to refer to data access cost.

In one embodiment of the invention, access costs for fact tables may be determined during an analysis phase prior to optimization. In such an embodiment, this determination may be performed for fact tables assumed to be under a nested join for good key access. If the nested join provides a good key access to the fact table, then the determination may be made by using a subset of the tables instead of scanning entire tables.

The cost estimate may be determined in terms of the number of seconds a table scan takes to complete. The cost estimate may be determined as a sum of CPU and data access costs of the resources, e.g., fact tables. Typically, data access costs are expressed in terms of seconds. Accordingly, in one embodiment of the invention, the CPU cost may also be determined in terms of seconds to facilitate direct summing with the data access costs.

At block 104, the optimizer may determine a budget based on the cost estimate. The budget may set a limit on the resources used to optimize the query. In one embodiment of the invention, the budget may limit the number of optimization tasks the optimizer may perform.

In one embodiment of the invention, the optimizer may budget the optimization time depending on the volume of data a query processes. The budget may be determined in a 2-step process: 1) Determine a budget time by multiplying the cost estimate by a pre-determined factor, e.g., 0.5, and 2) Convert the budget time to an optimization budget in terms of tasks.

In one embodiment of the invention, tasks may be determined using a predetermined ratio. It should be noted that the factor and ratios specified here are merely examples used for illustration. The factor and ratios may be adjusted based on results obtained from the optimizer.

In another embodiment of the invention, the budget may be capped by a pre-determined threshold. In such an embodiment, if the budget obtained using the process specified above exceeds the pre-determined threshold, the budget may be set to the cap instead. Capping the budget may ensure that, for extremely complex queries, the budget does not exceed the amount of work that can be realistically performed by the optimizer.

At block 106, the optimizer may determine the complexity of the query. The complexity may represent the amount of work the optimizer performs in optimizing the query.

The complexity may be a function of the number of joined entities in the query. As such, the complexity may represent the number of different join orderings the optimizer may explore when generating a query plan.

In one embodiment of the invention, the complexity may be a sum of several different values. The several different values may each represent a different function of the number of joined entities. For example, for each Join Back Bone in the query, a complexity may be determined. The Join Back Bone may represent a set of tables and operators joined together in the query plan. The complexity for the query may then be determined by summing all the of the Join Back Bone complexities.

Symbolically complexity can be denoted as:

$$\text{Query Complexity} = \Sigma \text{Complexity}(JBB_i) \quad \text{EQUATION 1}$$

Where $JBB_i$ may represent each Join Back Bone. Currently, for each $JBB_i$, a complexity may be determined, ranging from N to $N2^{(N-1)}$. The $N2^{(N-1)}$ complexity may represent the complexity of unconstrained enumeration by the optimizer.

Enumeration is the generation of possible portions of the query plan. During optimization, enumerated options may be explored to determine costs. Typically, the costs are a selection criteria when composing the query plan from the enumerated options. Cheaper cost options produce cheaper query plans.

In one embodiment of the invention, the Join Back Bone complexity values may be normalized. The normalization may be useful because the Join Back Bone complexity values may only denote the amount of work performed during join order enumeration.

However, there is additional work done in the optimizer towards optimizing physical aspects of a query plan. The additional work may depend on physical factors like partitioning, ordering etc.

For example, optimizing a query that only involves small non-partitioned tables may be performed within a relatively small number of tasks. This is so because parallelism options are not explored for such a query.

In one embodiment of the invention, a factor value may be used to normalize the Join Back Bone complexity values. The factor value may be the number of tasks used in pass 1 of the optimization. Pass 1 of the optimization uses a heuristic join order. Therefore, no time is spent performing join order optimization. The time spent in pass 1 is merely for optimizing physical aspects (e.g., partitioning) of the query plan.

By normalizing the complexity values, the additional work may be taken into account. Accordingly, the normalized complexity values may be more representative of the work performed by the optimizer than the raw complexity values.

At block 108, the optimizer may select an optimization strategy based on the complexity. The strategy may define the search space of alternative query plans explored during optimization. The search space may be constrained using parameters that specify how the query is optimized.

For example, certain optimizers use a two-pass process. In the first pass, a heuristic plan is generated. In the second pass, possible query plans may be generated and analyzed for costs.

One parameter of the strategy may specify how many passes are performed. If only the first pass is performed, the query plan may be generated from the heuristic plan. If both passes are performed, the query plan may be selected from the possible query plans based on cost.

A second parameter for the strategy may specify how large a search space may be enumerated in the generation of possible plans. The second parameter may specify a threshold value against which enumerated plan options are compared. Options that exceed the threshold may not be further enumerated or explored by the optimizer. As such, the second parameter may partition the search space of enumerated options.

To partition the search space based on the promise of finding a good plan, the concept of potential may be employed. In one embodiment of the invention, each enumerated option may be assigned a potential value.

The potential may denote the goodness of a plan as relating to data flow among different alternative plans. The lower the potential, the better the plan may be, as compared to other logically equivalent join orders. Logically equivalent join orders are join orders that join the same set of entities. Enumeration and potential are described in greater detail with reference to FIGS. 3A-3C.

Figure 2:
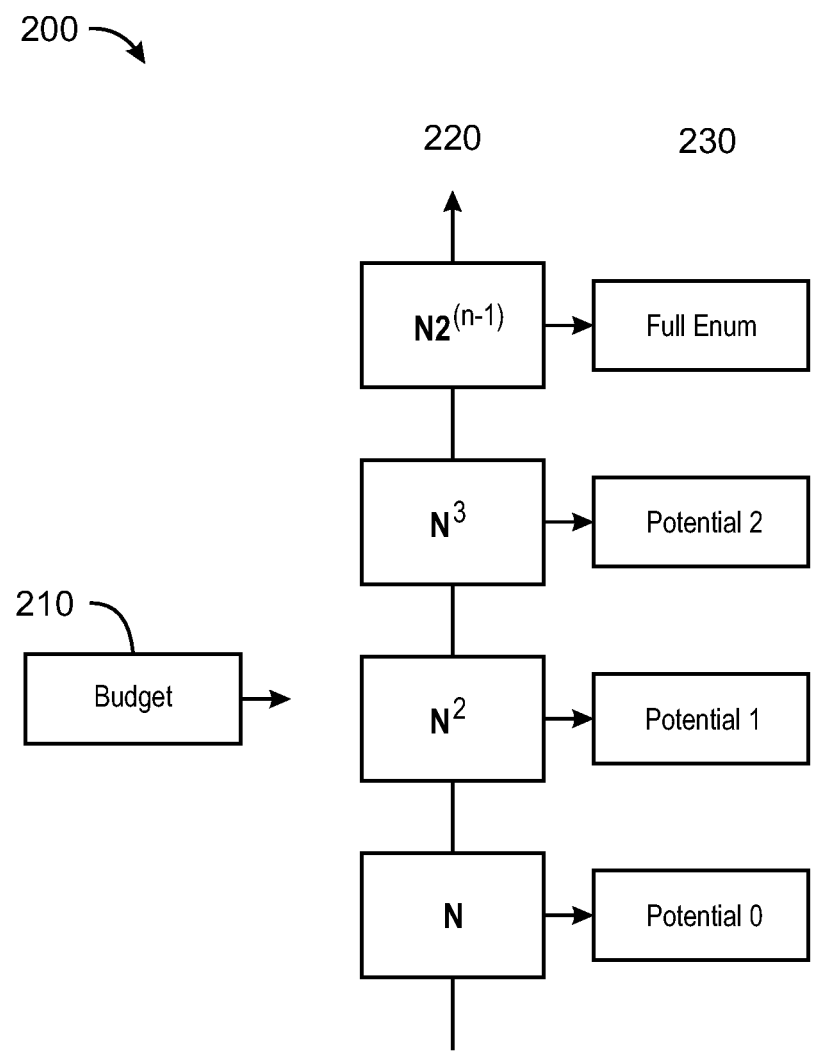
FIG. 2 is a block diagram of relationships between a budget, a complexity, and a strategy in accordance with an embodiment of the invention.

FIG. 2 is a block diagram of relationships between the budget 210, the complexity 220, and the strategy 230 in accordance with an embodiment of the invention. As stated previously, the strategy 230 selected may be based on the complexity 220. As shown, the budget 210 may approximate a certain level of complexity 220, ranging from N to $N2^{(n-1)}$. Additionally, each level of complexity 220 may be assigned a possible strategy 230. For example, for complexity N, the strategy of potential threshold value=0 may be assigned. As shown, complexity $N2^{(n-1)}$ represents full enumeration. As such, no potential threshold value may be used to control the search space.

The strategy 230, e.g., the potential threshold, may be determined based on the complexity 220 closest to the budget 210. If, for example, the budget 210 most closely approximates $N^2$ complexity, a strategy 230 with a potential threshold of 2 may be selected.

Referring back to FIG. 1, at block 110, the optimizer may optimize the query based on the strategy. The optimizer may try different implementation methods (e.g., hash join, merge join, nested join) along with different parallelism techniques to generate a number of possible query plans. The final query execution plan may then be chosen (based on cost) from the query plans enumerated.

In the enumeration process, a search space of possible plans is enumerated and evaluated to determine a low cost plan. The enumeration typically involves the application of an enumeration rule to various join orders from the heuristic plan. Through recursive application of this rule, a fully specified join order may be produced.

Figure 3A:
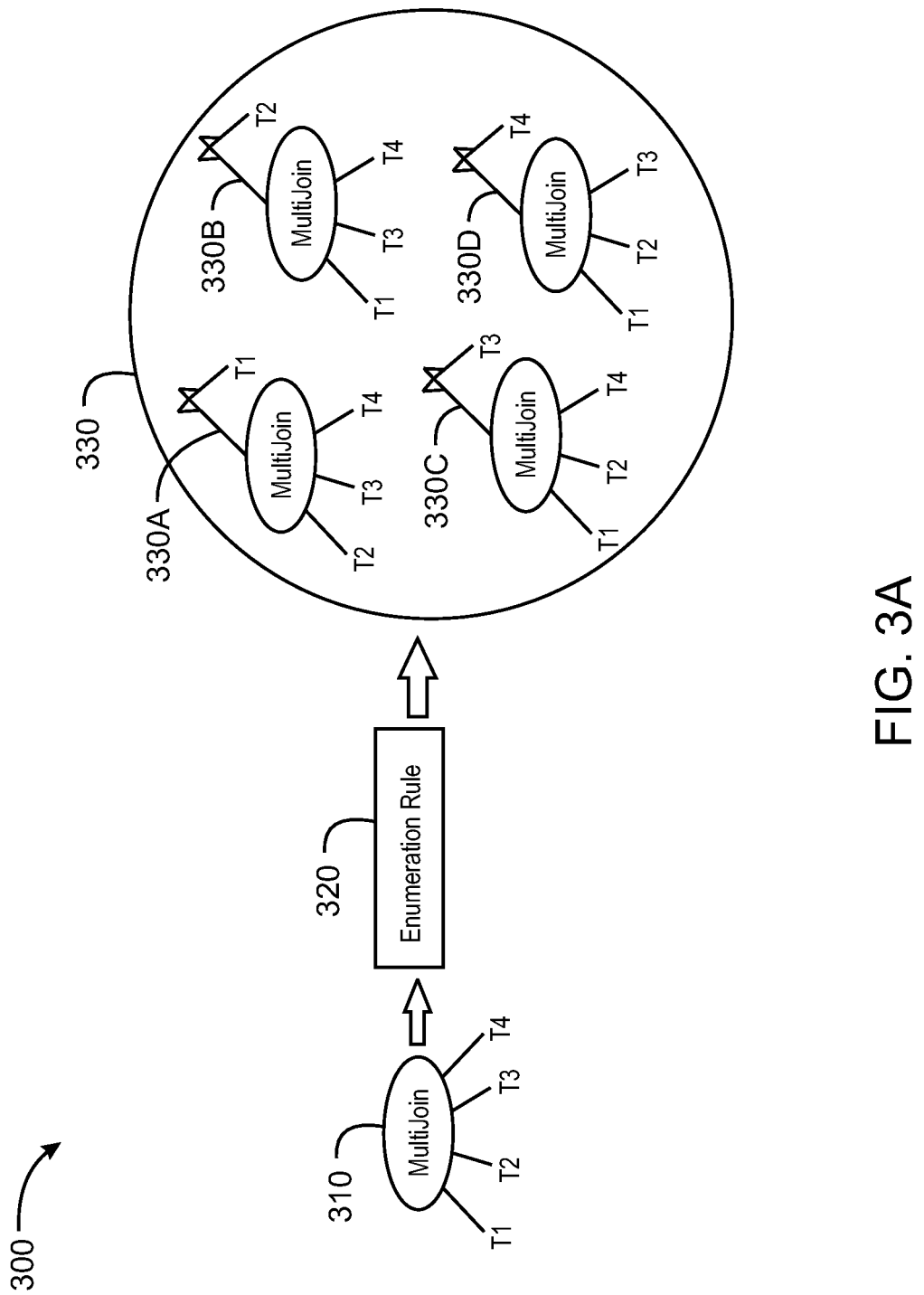
FIG. 3A is a block diagram of an enumeration step in accordance with an embodiment of the invention.

FIG. 3A is a block diagram of an enumeration step 300 in accordance with an embodiment of the invention. The enumeration step 300 represents one application of an enumeration rule 320, which produces a set of substitutes 330 for a join 310. The set 330 includes substitutes 330A, 330B, 330C, 330D.

If the optimizer were to perform full enumeration, all of the substitutes 330 may be further enumerated until a fully specified join order for each substitute 330 is produced. However, full enumeration typically triggers random pruning, which may eliminate possible plans with low costs.

In one embodiment of the invention, the substitutes 330 may be ranked according to their likelihood of producing a low cost plan. Only the highest ranked substitutes may be further enumerated to produce possible query plans.

The ranked substitutes 330 may be assigned a potential based on their position in the rankings. Lower dataflow may represent lower costs. Accordingly, the substitutes 330 may be ranked according to dataflow.

The ranking may be referred to as the potential. Lower potentials may represent substitutes 330 with lower cost. In one embodiment of the invention, the substitute 330 with the lowest dataflow may have the best potential, i.e., zero (0).

The dataflow of any substitute may be determined by summing the dataflows of the original join children and the dataflow for the multijoin in the particular substitute.

Figure 3B:
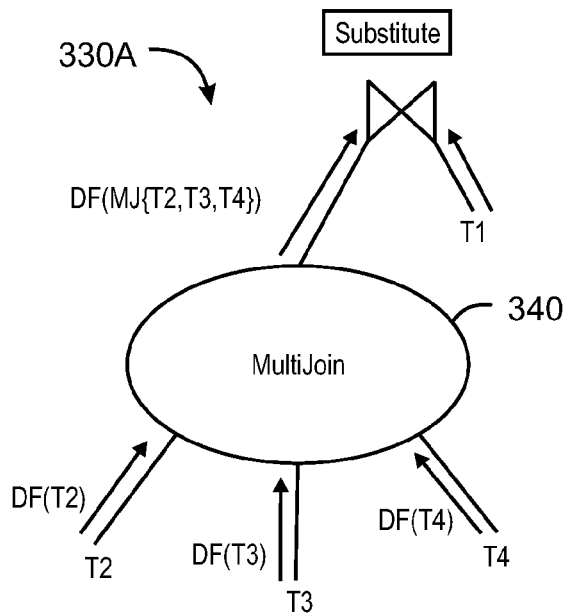
FIG. 3B is a block diagram of dataflow for a substitute in accordance with an embodiment of the invention.

FIG. 3B is a block diagram of dataflow for the substitute 330A in accordance with an embodiment of the invention. As shown, dataflow (DF) for the substitute 330A is equal to the dataflow of the original join 330 children T1, T2, T3, T4, and the dataflow of the multijoin 340.

It should be noted that DF(T1)+DF(T2)+DF(T3)+DF(T4) is common to the dataflow of all the substitutes 330. As such, the dataflow of the multijoins of each substitute serves as a discriminating factor between the dataflow for each substitute 330.

Once the potential is assigned to the substitutes, further enumeration may be performed for only the substitutes 330 with a potential less than the potential threshold specified in the strategy.

In one embodiment of the invention, a potential may also be assigned to the cascades group for the substitutes 330. The cascades groups may be a set of groups that constitute the memo structure used to store all the expressions enumerated by the optimizer. Typically, the optimizer groups logically equivalent expressions into a single cascades group. Typically, groups of logically equivalent expressions, such as cascades groups, are referred to as equivalence groups.

In such an embodiment, the potential for the substitute 330 may be the sum of the potential specified above (ranking), and the potential of the cascades group to which the substitute 330 belongs.

Figure 4:
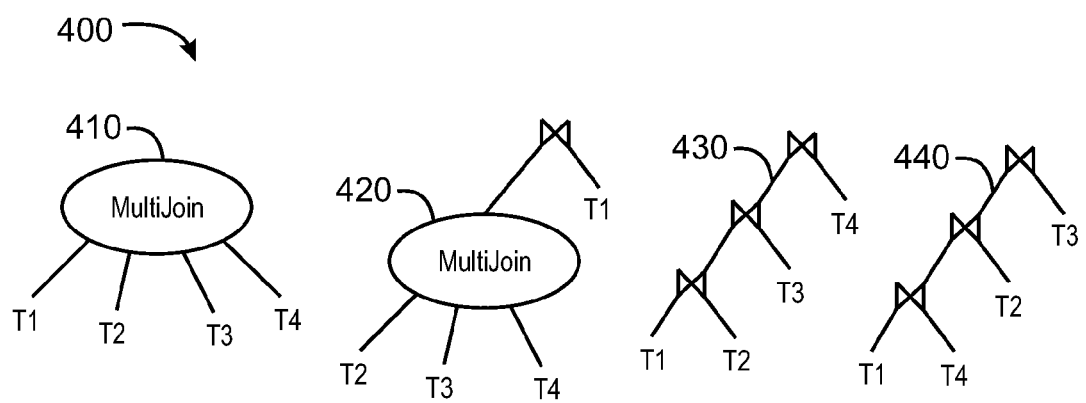
FIG. 4 is a block diagram of a cascades group in accordance with an embodiment of the invention.

FIG. 4 is a block diagram of a cascades group 400 in accordance with an embodiment of the invention. The cascades group 400 includes logically equivalent expressions 410, 420, 430, and 440.

Figure 5A:
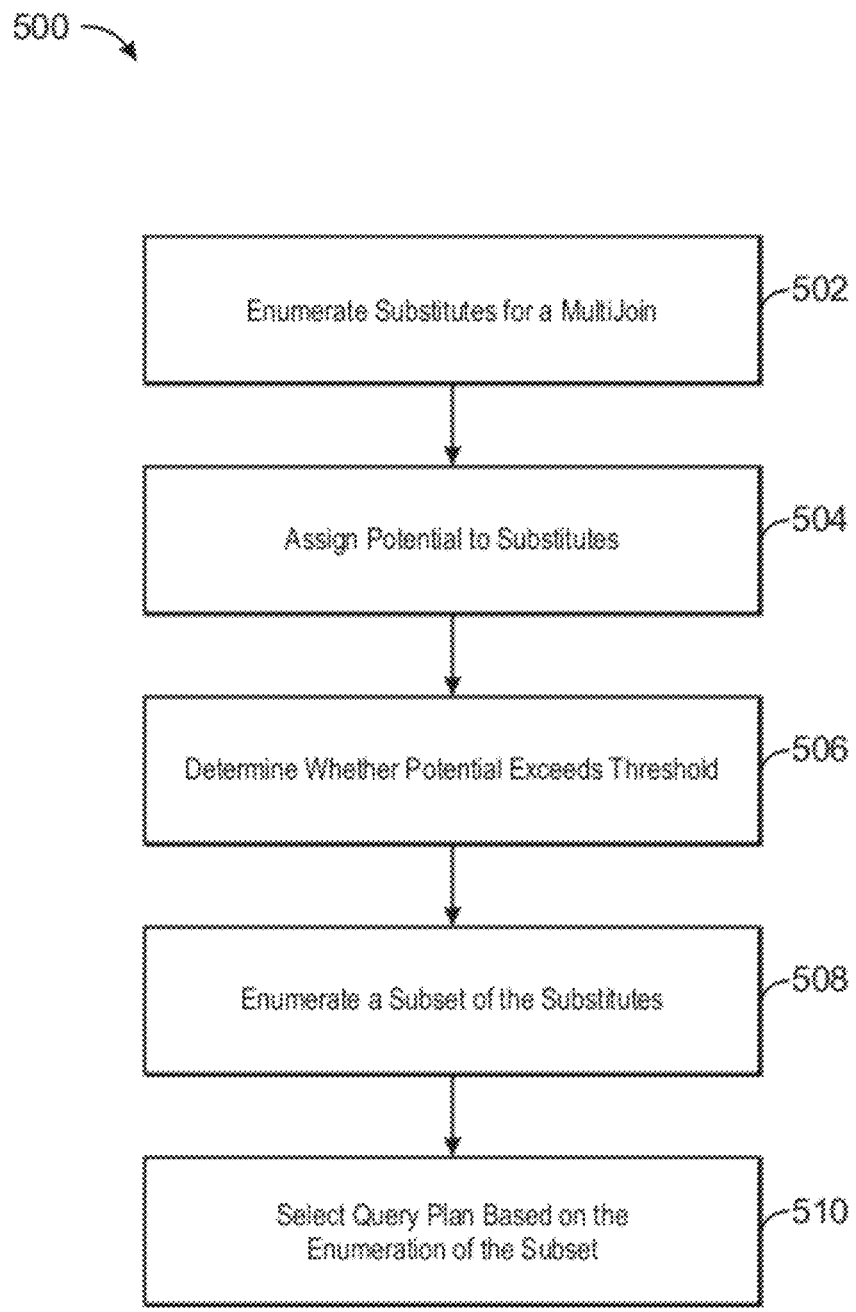
FIG. 5A is a process flow diagram of a method for optimizing a query in accordance with an embodiment of the invention.

FIG. 5A is a process flow diagram of a method 500 for optimizing a query in accordance with an embodiment of the invention. It should be understood that the process flow diagram is not intended to indicate a particular order of execution. The method 500 may be performed by the optimizer.

Figure 5B:
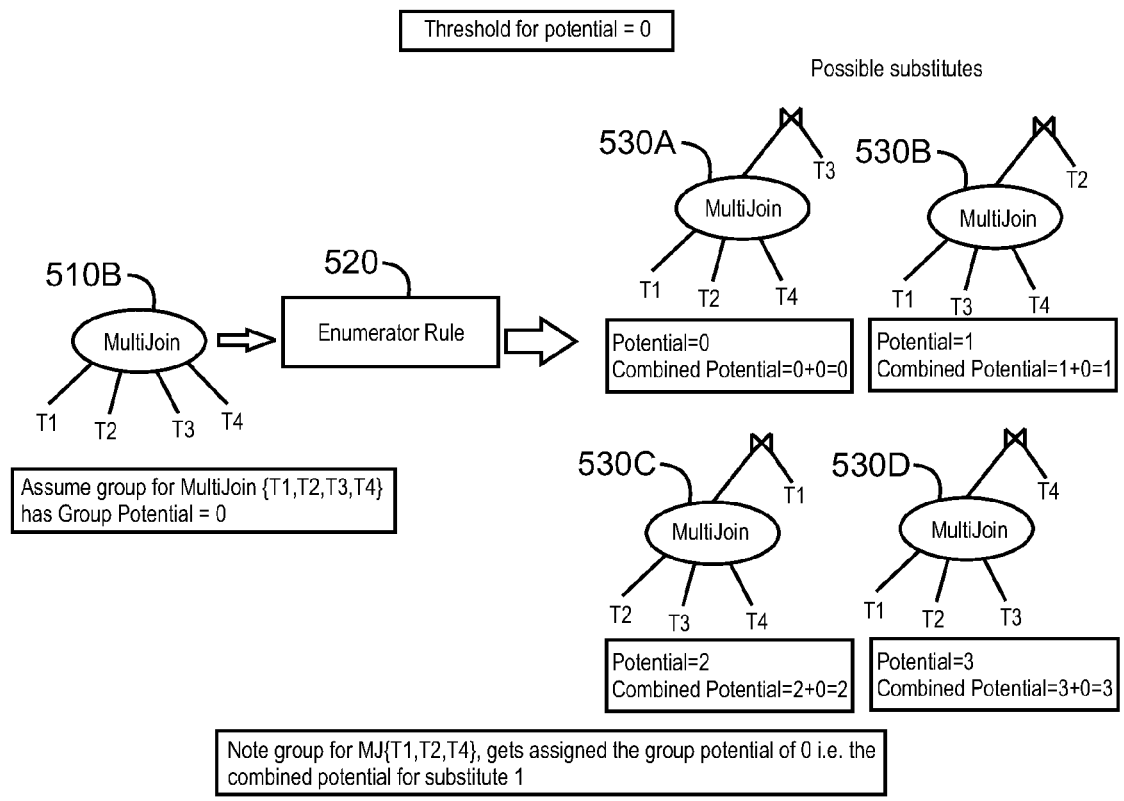
FIGS. 5B-5C are data flow diagrams of methods for optimizing a query in accordance with an embodiment of the invention.
Figure 5C:
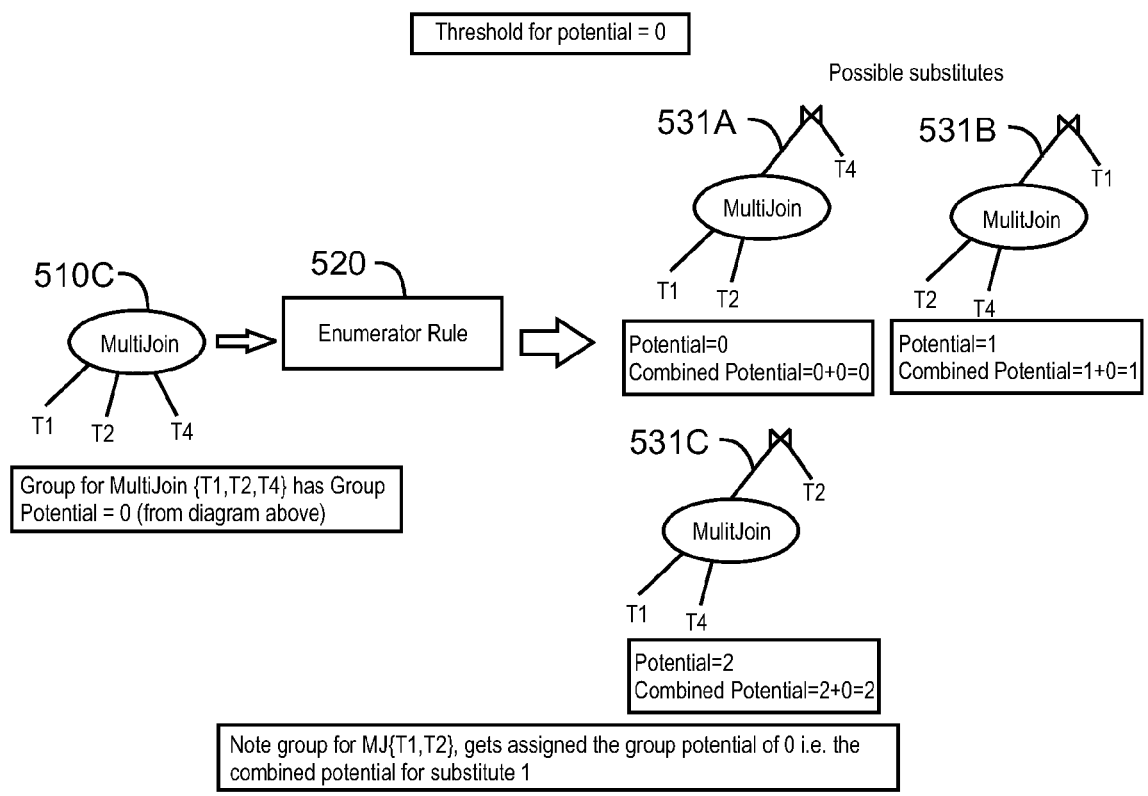

The method 500 is described with reference to FIGS. 5B-5C, which are data flow diagrams of methods for optimizing a query in accordance with an embodiment of the invention.

The method 500 begins at block 502, where the optimizer may enumerate substitutes for a multijoin. Referring to FIG. 5B, the enumeration rule 520 may be applied to the multijoin 510B, producing substitutes 530A, 530B, 530C, 530D.

Referring back to FIG. 5A, at block 504, the optimizer may assign a potential to each of the substitutes 530A, 530B, 530C, 530D. As stated previously, the potential may represent a ranking of the substitutes based on the dataflow for each. As shown in FIG. 5B, the potentials for the substitutes 530A, 530B, 530C, 530D are 0, 1, 2, and 3, respectively.

At block 506, the optimizer may determine whether the potential of each substitute 530A, 530B, 530C, 530D exceeds a pre-determined threshold. In this example, the predetermined threshold is 0. As such, the substitutes, 530B, 530C, and 530D exceed the predetermined threshold.

At block 508, the optimizer may enumerate a subset of the substitutes. The subset may include the substitute below the predetermined threshold, substitute 530A. As shown in FIG. 5C, the multijoin 510C is the multijoin of the substitute 530A. The enumeration rule 520 may be applied to the multijoin 510C, producing substitutes 531A, 531B, 531C. Blocks 504-508 may be recursively repeated until the search space is exhausted, or the optimizer's resources are used up. At block 510, the optimizer may select a query plan from the options enumerated as described above.

In another embodiment of the invention, the optimizer may prioritize the enumeration of potentially lower cost plans. The optimizer works by performing different tasks on the expressions in a cascades group.

Figure 6A:
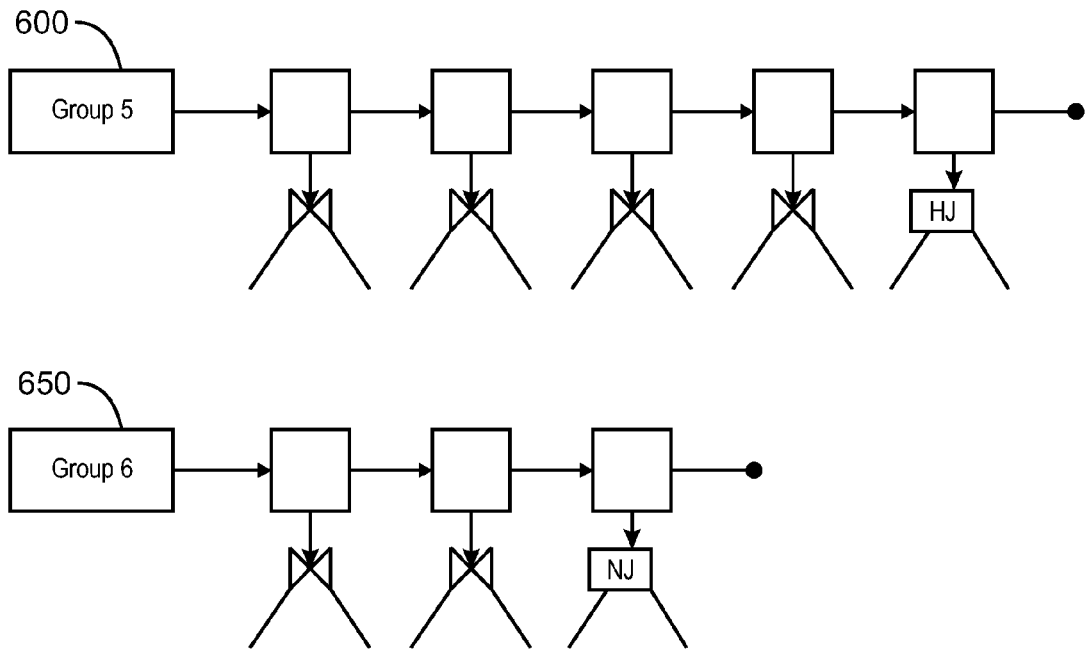
FIGS. 6A-6B are block diagrams of cascade groups in accordance with an embodiment of the invention.

FIG. 6A is a block diagram of cascades groups 600, 650 in accordance with an embodiment of the invention. As shown, cascades groups 600, 650 may be represented as linked lists of expressions. The linked lists may be used to generate a task stack.

The tasks that the optimizer performs on the expressions in a cascades group 600, 650 are placed in a task stack. For example, a task stack may be generated for the cascades group 600.

Figure 6B:
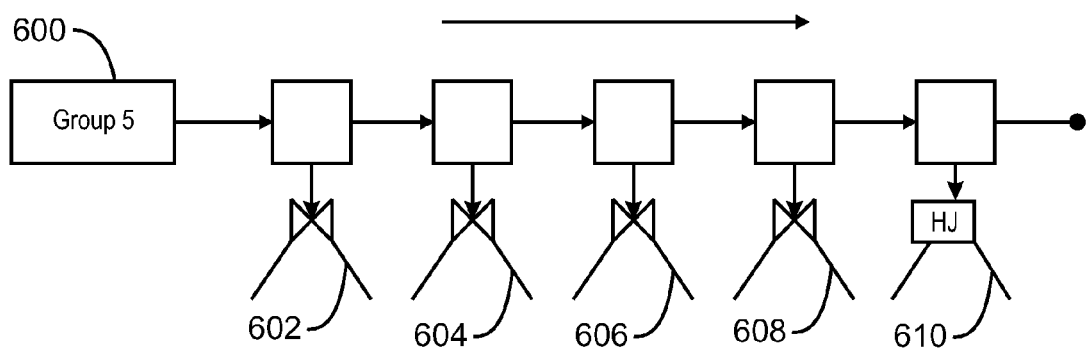

FIG. 6B is a block diagram of the cascades group 600 in accordance with an embodiment of the invention. Each expression may be added to the task stack in the sequence shown.

As such, the tasks for the expressions on the right may be on top of expressions from the left of the group 600. The order of the tasks in the task stack may determine the order in which the tasks are performed.

In order to prioritize the enumeration of likely lower cost plans, the task stack may be generated such that tasks on expressions with lower dataflow are performed before tasks for expressions with greater dataflow.

In one embodiment of the invention, the expressions in the cascades group 600 are arranged in order of their assigned potential. In other words, the potential for expression 602 may be lower than the potential for expression 604. Expression 604 has lower potential than expression 606, etc.

As such, when the task stack is generated from the cascades group 600, the task stack may include expressions with lowest potential, e.g., dataflow, on top, and highest potential at the bottom. As such, the optimizer may perform tasks for the low cost expressions before the high cost expressions.

Figure 7:
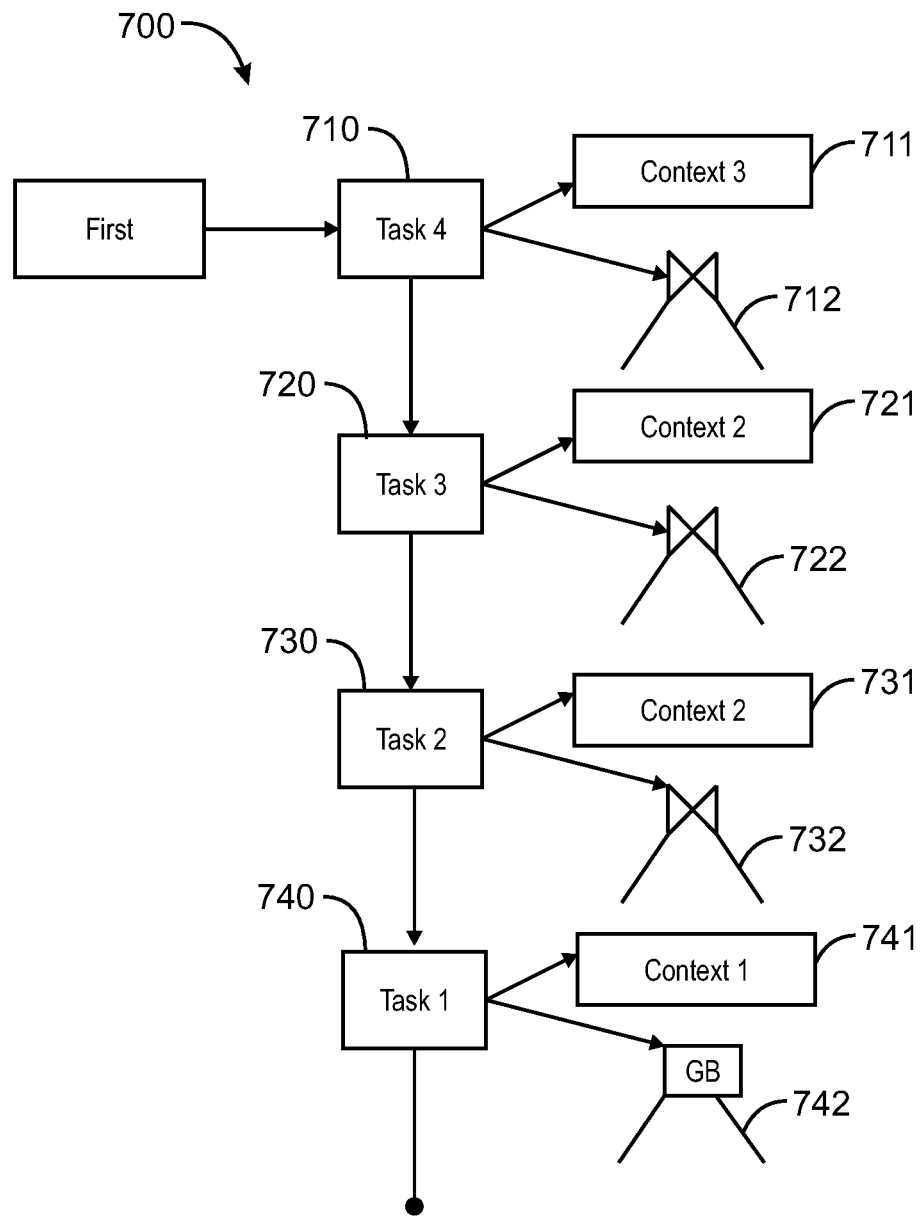
FIG. 7 is a block diagram of a task stack in accordance with an embodiment of the invention.

FIG. 7 is a block diagram of a task stack 700 in accordance with an embodiment of the invention. As shown, task 710 "Task 4" is at the top of the stack 700. Accordingly, task 710 may be performed first.

Each task 710, 720, 730, 740 may do something to a relational expression 712, 722, 732, 742 (e.g., join, group by, hash join, etc.) from the cascades group. In addition to the expression, the tasks are also associated with contexts 711, 721, 731, 741. The contexts 711, 721, 731, 741 may specify an optimization goal of the task 710, 720, 730, 740.

Generally, when a task is added to the stack 700, the tasks are placed at the top of the stack 700. To ensure that, given a context 711, 721, 731, 741, the expression 712, 722, 732, 742 with the lower potential is optimized before an expression with a higher potential, the expression 712, 722, 732, 742 with the higher potential may be inserted into the stack before the expression 712, 722, 732, 742 with the lower potential.

It should be noted that, for very complex queries, the optimizer may invoke a graceful termination process. In such a scenario, the second pass of optimization may be bypassed.

Advantageously, limiting the enumerated search space may reduce the time spent in the second pass of optimization. Accordingly, the parameters specifying when graceful termination starts may be relaxed.

Figure 8:
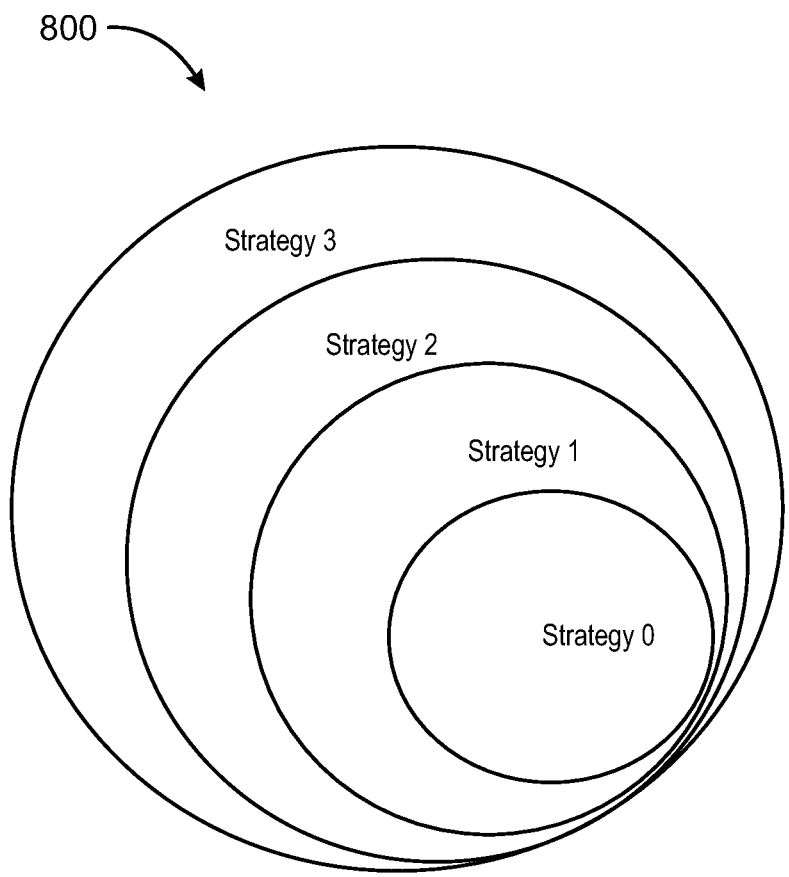
FIG. 8 is a block diagram of strategies in accordance with an embodiment of the invention.

FIG. 8 is a block diagram of strategies 800 in accordance with an embodiment of the invention. In a multipass optimizer, each subsequent pass can enumerate plan options according to a strategy being implemented in that pass. For example, pass 1 may enumerate the search space specified by strategy 0. Strategy 0 may specify a potential threshold=0. Pass 2 may enumerate parts of the search space specified by strategy 1 (potential threshold=1), etc.

In one embodiment of the invention, the successive enumerations may be limited to those parts of the query plan not already enumerated in a previous pass. Advantageously, each pass may provide a decision point at which the optimizer may determine whether to perform another pass. The budget may also be re-determined after every pass.

In such an embodiment, the work done by the optimizer in each pass may be rolled up at specified intervals (i.e., after every pass) which is good for fault tolerance in case aggressive pruning kicks in. This happens when the optimizer starts running out of resources (e.g., memory).

Figure 9:
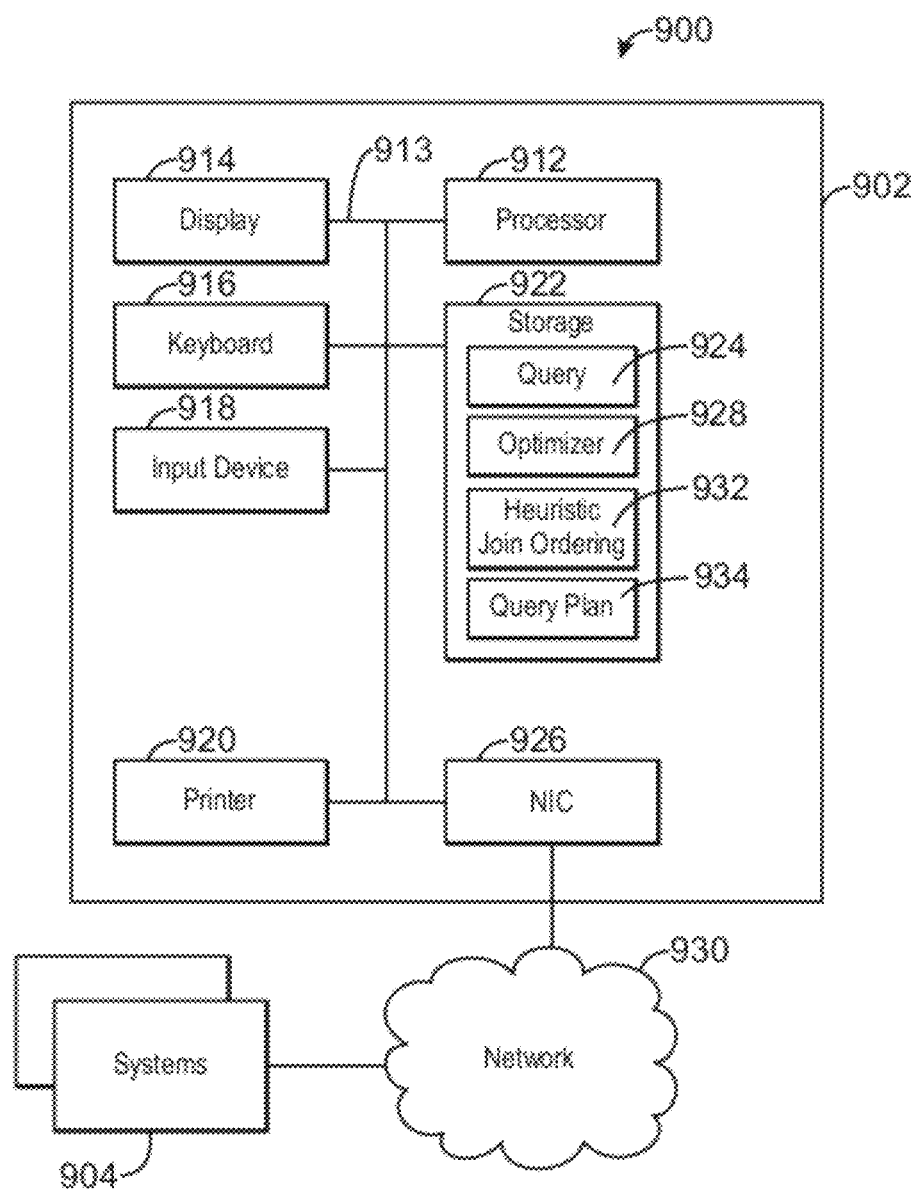
FIG. 9 is a block diagram of a system for optimizing a query in accordance with an embodiment of the invention.

FIG. 9 is a block diagram of a system for optimizing a query in accordance with an embodiment of the invention. The system is generally referred to by the reference number 900. Those of ordinary skill in the art will appreciate that the functional blocks and devices shown in FIG. 9 may comprise hardware elements, software elements, or some combination of software and hardware. The hardware elements may include circuitry. The software elements may include computer code stored on a non-transitory, computer-readable medium.

Additionally, the functional blocks and devices of the system 900 are but one example of functional blocks and devices that may be implemented in an embodiment of the invention. Those of ordinary skill in the art would readily be able to define specific functional blocks based on design considerations for a particular electronic device.

The system 900 may include servers 902, 904, in communication over a network 930. The server 904 may be similarly configured to the server 902.

As shown, the server 902 may include one or more processors 912, which may be connected through a bus 913 to a display 914, a keyboard 916, one or more input devices 918, and an output device, such as a printer 920. The input devices 918 may include devices such as a mouse or touch screen.

The server 902 may also be connected through the bus 913 to a network interface card 926. The network interface card 926 may connect the database server 902 to the network 930.

The network 930 may be a local area network, a wide area network, such as the Internet, or another network configuration. The network 930 may include routers, switches, modems, or any other kind of interface device used for interconnection. In one embodiment of the invention, the network 930 may be the Internet.

The server 902 may have other units operatively coupled to the processor 912 through the bus 913. These units may include non-transitory, computer-readable storage media, such as storage 922.

The storage 922 may include media for the long-term storage of operating software and data, such as hard drives. The storage 922 may also include other types of non-transitory, computer-readable media, such as read-only memory and random access memory.

The storage 922 may include the software used in embodiments of the present techniques. In an embodiment of the invention, the storage 922 may include a query 924, optimizer 928, and a query plan 934.

In addition to using the potential to enumerate a certain part of the query execution plan search space, the optimizer 928 may prioritize the plans explored based on the potential. In other word, the optimizer 928 may work on possible plan expressions with lower potential values. This may ensure that the optimizer 928 looks in more promising parts of the search space first, ensuring that the more promising areas of the search space are explored before the less promising ones.

Advantageously, an enumeration of a limited, high promise area of the search space may produce a better query plan 934 than an enumeration of the full search space with random pruning. This may be due to the random pruning of the search space without regard to the likelihood of producing a low cost plan.

In one embodiment of the invention, the strategy may be specified automatically based on the cost and complexity of the query 924.

Accordingly, the optimizer 928 may be constrained in a way that ensures more promising parts of the search space are explored first, hence attenuating the impact on plan quality for complex queries.

Figure 10:
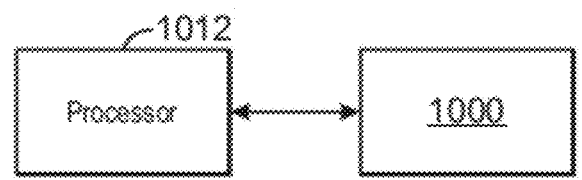
FIG. 10 is a block diagram showing a non-transitory, computer-readable medium that stores code for optimizing a query in accordance with an embodiment of the invention.

FIG. 10 is a block diagram showing a non-transitory, computer-readable medium that stores code for optimizing a query in accordance with an embodiment of the invention. The non-transitory, computer-readable medium 1000 may correspond to any typical storage device that stores computer-implemented instructions, such as programming code or the like. For example, the non-transitory, computer-readable medium 1000 may include one or more of a non-volatile memory, a volatile memory, and/or one or more storage devices.

Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices.

A processor 1002 generally retrieves and executes the computer-implemented instructions stored in the non-transitory, computer-readable medium 1000 to generate incremental updates. A cost estimate may be determined for a query. A budget may be determined based on the cost estimate. The complexity of the query may be determined. A strategy may be selected based on the complexity and the budget. The query may be optimized based on the strategy.

What is claimed is:

1. A method of optimizing a query, comprising:
    determining a cost estimate for a query;
    determining a budget for optimizing the query based on the cost estimate;
    determining a normalized complexity of the query;
    determining a strategy based on the normalized complexity and the budget, wherein the strategy specifies a limit to a search space enumerated during optimization of the query; and
    optimizing the query based on the strategy.

2. The method recited in claim 1, wherein the strategy comprises:
    a maximum pass parameter specifying a limit to a number of passes performed by a multi-pass optimizer, wherein the multi-pass optimizer optimizes the query; and
    a potential threshold, wherein a portion of the search space exceeding the potential threshold is not enumerated during optimization.

3. The method recited in claim 1, further comprising:
    generating a heuristic query plan for the query;
    enumerating a heuristic query plan from a multijoin to generate a first plurality of substitutes for the multijoin;
    assigning a potential to each of the first plurality of substitutes, wherein the potential comprises a potential to produce a low cost query plan; and
    generating a query plan based on the assigned potential and the first plurality of substitutes.

4. The method recited in claim 3, wherein assigning the potential comprises:
    determining a dataflow for each of the first plurality of substitutes;
    ranking the first plurality of substitutes in ascending order of the dataflow; and
    determining the potential based on the ranking.

5. The method recited in claim 3, wherein generating the query plan comprises:
    generating an equivalence group comprising a first plurality of subsets;
    generating a task stack based on the equivalence group and the potential, wherein the task stack is ordered from top to bottom in an ascending order of the potential; and
    performing the tasks based on the task stack.

6. The method recited in claim 3, wherein generating the query plan comprises:
    determining whether each of the first plurality of substitutes exceeds a predetermined threshold;
    selecting a subset of the first plurality of substitutes based on the determination;
    enumerating a second plurality of substitutes from the selected subset; and
    generating the query plan based on the enumeration of the second plurality of substitutes.

7. The method recited in claim 1, further comprising:
    enumerating a plurality of possible query plans for the query;
    assigning a potential to each of the plurality of possible query plans, wherein the potential represents a ranking based on likelihood of producing a low cost query plan; and
    generating a query plan based on the assigned potential and the plurality of possible query plans.

8. The method recited in claim 1, wherein optimizing the query comprises performing multiple passes of optimization, wherein each pass is associated with a corresponding strategy, wherein the corresponding strategy of a subsequent pass specifies a larger search space than a search space of a previous pass.

9. A computer system for optimizing a query, comprising:
    a memory storing instructions;
    a processor configured to execute the instructions to: determine a cost estimate for a query;
    determine a budget for optimizing the query based on the cost estimate;
    determine a normalized complexity of the query;
    determine a strategy based on the normalized complexity and the budget, wherein the strategy comprises a potential threshold, wherein a portion of a search space that exceeds the potential threshold is not enumerated during optimization; and
    optimize the query based on the strategy.

10. The computer system recited in claim 9, wherein the strategy comprises a maximum pass parameter specifying a limit to a number of passes performed by a multi-pass optimizer, wherein the multi-pass optimizer optimizes the query.

11. The computer system recited in claim 9, wherein the processor is configured to:
    generate a heuristic query plan for the query;
    enumerate a heuristic query plan from a multijoin to generate a first plurality of substitutes for the multijoin;
    assign a potential to each of the first plurality of substitutes, wherein the potential represents a ranking based on a likelihood of producing a low cost query plan; and
    generate a query plan based on the assigned potential, the potential threshold, and the first plurality of substitutes.

12. The computer system recited in claim 11, wherein the potential is assigned by the processor being configured to:
    determine a dataflow for each of the first plurality of substitutes;
    rank the first plurality of substitutes in ascending order of the dataflow; and
    determine the potential based on the ranking.

13. The computer system recited in claim 11, wherein the query plan is generated by the processor being configured to:
    generate an equivalence group comprising a first plurality of subsets;
    generate a task stack based on the equivalence group and the potential, wherein the task stack is ordered from top to bottom in an ascending order of the potential; and
    perform the tasks based on the task stack.

14. The computer system recited in claim 11, wherein the query plan is generated by the processor being configured to:
    determine whether each of the first plurality of substitutes exceeds the potential threshold;

select a subset of the first plurality of substitutes based on the determination;
enumerate a second plurality of substitutes from the selected subset; and
generate the query plan based on the enumeration of the second plurality of substitutes.

15. The computer system recited in claim 9, wherein the processor is configured to:
enumerate a plurality of possible query plans for the query;
assign a potential to each of the plurality of possible query plans, wherein the potential represents a ranking based on a likelihood of producing a low cost query plan; and
generate a query plan based on the assigned potential and the plurality of possible query plans.

16. The computer system recited in claim 9, wherein the query is optimized by the processor being configured to perform multiple passes of optimization, wherein each pass is associated with a corresponding strategy, wherein the corresponding strategy of a subsequent pass specifies a larger search space than a search space of a previous pass.

17. A non-transitory, computer-readable medium comprising machine-readable instructions executable by a processor to optimize a query, wherein the machine-readable instructions, when executed by the processor, cause the processor to:
determine a cost estimate for a query;
determine a budget for optimizing the query based on the cost estimate;
determine a normalized complexity of the query;
determine a strategy based on the normalized complexity and the budget, wherein the strategy comprises a potential threshold;
generate a plurality of possible query plans for the query;
assign a potential to each of the plurality of possible query plans, wherein the potential represents a ranking based on a likelihood of producing a low cost query plan;
determine whether the plurality of possible query plans exceeds the potential threshold;
enumerate the plurality of possible query plans based on the determination; and
generate a query plan based on the enumeration.

18. The non-transitory, computer-readable medium recited in claim 17, comprising machine-readable instructions which, when executed by the processor, cause the processor to:
determine an equivalence group of each of the plurality of possible query plans;
assign a group potential to each of the equivalence groups; and
enumerate the plurality of possible query plans based on the group potential.

19. The non-transitory, computer-readable medium recited in claim 17, wherein the machine-readable instructions that cause the processor to assign the potential comprises machine-readable instructions that cause the processor to:
determine a dataflow for each of plurality of possible query plans;
rank the plurality of possible query plans in ascending order of the dataflow; and
determine the potential based on the ranking.

20. The non-transitory, computer-readable medium recited in claim 17, wherein the machine-readable instructions that cause the processor to generate a plurality of possible query plans comprises machine-readable instructions that cause the processor to:
generate a heuristic query plan for the query;
enumerate a multijoin of the heuristic query plan to generate a first plurality of substitutes for the multijoin;
assign a potential to each of the first plurality of substitutes, wherein the potential represents a ranking based on a likelihood of producing a low cost query plan; and
generate the query plan based on the assigned potential and the first plurality of substitutes.

* * * * *